United States Patent
Kobayashi

(10) Patent No.: US 8,280,228 B2
(45) Date of Patent: Oct. 2, 2012

(54) INFORMATION RECORDING AND REPRODUCING APPARATUS

(75) Inventor: Koji Kobayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1256 days.

(21) Appl. No.: 12/071,649

(22) Filed: Feb. 25, 2008

(65) Prior Publication Data

US 2008/0209475 A1    Aug. 28, 2008

(30) Foreign Application Priority Data

Feb. 26, 2007    (JP) .................................. 2007-044831

(51) Int. Cl.
*H04N 5/76*    (2006.01)
(52) U.S. Cl. ........................................ 386/296; 386/297
(58) Field of Classification Search .................. 386/200, 386/291, 297
See application file for complete search history.

(56) References Cited

U.S. PATENT DOCUMENTS

| | | | | |
|---|---|---|---|---|
| 5,517,256 A | * | 5/1996 | Hashimoto | 725/58 |
| 2006/0104613 A1 | * | 5/2006 | Kunii | 386/94 |
| 2008/0118222 A1 | * | 5/2008 | Choi | 386/83 |
| 2008/0141311 A1 | * | 6/2008 | Tsuji | 725/58 |

FOREIGN PATENT DOCUMENTS

| | | | |
|---|---|---|---|
| JP | 2002152645 A | * | 5/2002 |
| JP | 2006-013840 | | 1/2006 |
| JP | 2006-049938 | | 2/2006 |

* cited by examiner

*Primary Examiner* — Huy T Nguyen
(74) *Attorney, Agent, or Firm* — Morgan, Lewis & Bockius LLP

(57) ABSTRACT

An information recording and reproducing apparatus includes a tuner, a recording and reproducing unit to record a television program selected by the tuner into a recording medium and to reproduce the television program recorded in the recording medium, and a system controller that includes a program identification information storage unit to store, in a case where an automatic recording function is set and when the television program is watched or when the television program is reservation-recorded, program identification information including a broadcast day of the week, a broadcast time zone and a channel of the television program into a memory, and a program recording unit to cause, when a main power source of the apparatus is off and when a time reaches a record start time of a television program of this week corresponding to program identification information of the last week stored in the memory, the recording and reproducing unit to record the television program of this week into the recording medium.

2 Claims, 4 Drawing Sheets

INFORMATION RECORDING AND REPRODUCING APPARATUS

This application is based on Japanese Patent Application No. 2007-044831 filed on Feb. 26, 2007, the contents of which are hereby incorporated by reference.

BACKGROUND OF THE INVENTION

1. Field of the Invention

The present invention relates to an information recording and reproducing apparatus for recording a television program selected by a tuner on the apparatus side into a recording medium or for reproducing the television program recorded in the recording medium.

2. Description of the Related Art

In recent years, the improvement for ultra high definition of a television receiver connected to a hard disk drive or an optical disk drive as an information recording and reproducing apparatus is remarkably advanced by the progress in liquid crystal panel manufacturing techniques, and video data with a very large amount of information can be displayed at high definition. In the television receiver as stated above, in order to cause very large video data and audio data to be transmitted from the information recording and reproducing apparatus, an interface called HDMI (High Definition Multimedia Interface) is used.

The HDMI is an interface for transmitting video data and audio data from an information recording and reproducing apparatus to a receiver equipment such as a television receiver or a projector. The HDMI is an extension of DVI (Digital Visual Interface for Computer) Ver 1.0 of a conventional standard. Specifically, the DVI is an interface of a standard for transmitting only video data, whereas the HDMI is an interface of a standard in which audio data and other data, in addition to video data, can also be transmitted through a single cable. Further, the HDMI can transmit high quality multi-channel audio data and high resolution video data of various formats.

The HDMI can also be used for transmitting various types of information (monitor information, for example, an EDID data structure, etc.) by DDC (Display Data Channel) communication. The EDID (Extended Display Identification Data) includes resolution that a receiver equipment can receive, audio stream information, speaker information of an HDMI reception unit and the like. Besides, the HDMI can transmit video data and audio data through a single cable, and has a merit that the inconvenience of connecting plural cables is eliminated. For example, in the case where content in CSS (Content Scrambling System) is outputted from the information recording and reproducing apparatus, the HDMI is an interface of a standard approved by CPAC (Copy Protection Advisory Council).

The DDC is a name of a communication format and is a line used for transmitting display conditions of video data and conditions of audio data as well as other data relating to an HDMI monitor to the information recording and reproducing apparatus. The DDC is connected to a communication line in the information recording and reproducing apparatus, and is used for establishing a line between the information recording and reproducing apparatus and the HDMI monitor. The CSS is a system for encoding data and recording it, and for decoding it at the time of reproduction.

In the case where a television program is recorded (picture-recorded), a hard disk capable of recording a large amount of data is often used. In the case where it is desired to previously perform a record reservation (picture recording reservation) of the television program in order to record the television program into the hard disk, the hard disk drive conventionally has a record reservation function to perform the record reservation of the television program.

In the case where the record reservation of the television program is performed using this record reservation function, the user operates a remote control to cause an electronic program guide (EPG) to be displayed on a display device, selects the television program to be record-reserved from the electronic program, and performs a decision operation, so that the record reservation of the television program is completed. Besides, the record reservation can be performed using a G-code displayed in the detailed contents of the electronic program guide or a G-code included in a program guide on a news paper or the like.

The same television program is usually repeated on the same day every week, and there is a case where the user desires to watch or to reservation-record a favorite television program every week. For example, the user watches or reservation-records a television program A on Thursday, the broadcast time zone of which is 7:00 to 8:00 and the channel of which is channel 2, and watches or reservation-records a television program B on Thursday, the broadcast time zone of which is 8:00 to 9:00 and the channel of which is channel 4. Besides, the user watches or reservation-records a television program C on Friday, the broadcast time zone of which is 7:00 to 8:00 and the channel of which is channel 10, and watches or reservation-records a television program D on Friday, the broadcast time zone of which is 9:00 to 10:00 and the channel of which is channel 8. Besides, the user watches or reservation-records a television program E on Saturday, the broadcast time zone of which is 5:00 to 6:00 and the channel of which is channel 6.

For example, in the case where the user watched or reservation-recorded the television programs A, B, C, D and E in the last week, there is a case where the user desires to watch or reservation-record the television programs A, B, C, D and E also in this week. In brief, there is a case where the user desires to watch or reservation-record the same television program every week. However, in the information recording and reproducing apparatus of the related art, even in the case where the same television program is reservation-record every week, the record reservation must be made using the electronic program guide or the G-code, and accordingly, the operation of the record reservation is troublesome, and in the case where the record reservation is forgotten, there is a problem that the television program that is watched every week can not be watched.

Then, a recording apparatus disclosed in JP-A-2006-49938 is structured such that channels of programs watched from the present time to one week before are stored every hour, and further, channels of programs watched from one week before to two weeks before are stored every hour, and in the case where programs of the same channel are watched on the same day of the week and at the same time of day in the period from the present time to one week before and the period from one week before to two weeks before, the programs of the channel are recorded.

However, in this recording apparatus, although the channels of the programs watched from the present time to one week before are stored every hour, there is a case where even if the user desires to watch a program from the present time to one week before, the program can not watched because of user's circumstances, and in this case, there is a case where the user desires to picture-record (record) a program, which the user desires to watch, by picture recording reservation (record reservation). Thus, in the case where the watching of a desired program is forgotten in the period from the present time to one week before or in the case where the picture recording by the picture recording reservation is performed, when only the process as in this recording apparatus is performed in which the programs of the channel are recorded in the case where the programs of the same channel are watched on the same day of the week and at the same time of day in the period from the present time to one week before and the period from one week before to two weeks before, it can not be said that the program desired to be watched every week can be recorded without fail.

Incidentally, in a channel selection receiving device and a channel selection method disclosed in JP-A-2006-13840, it is determined whether or not there is a channel selected on the same day of the week and in the same time zone of the last week, and in the case of yes, the channel is selected. However, it is not disclosed that a program desired to be watched every week is recorded by an information recording and reproducing apparatus such as a hard disk drive.

SUMMARY OF THE INVENTION

The present invention has an object to provide an information recording and reproducing apparatus in which a television program desired to be watched every week can be watched without fail even in the case where the watching of the television program desired to be watched every week is forgotten or the record reservation thereof is forgotten.

In order to achieve the object, an information recording and reproducing apparatus of the invention includes a tuner, a recording and reproducing unit configured to record a television program selected by the tuner into a recording medium and to reproduce the television program recorded in the recording medium, and a system controller that includes a program identification information storage unit configured to store, in a case where an automatic recording function is set and when the television program is watched or when the television program is reservation-recorded, program identification information including a broadcast day of the week, a broadcast time zone and a channel of the television program into a memory, and a program recording unit configured to cause, when a main power source of the apparatus is off and when a time reaches a record start time of a television program of this week corresponding to program identification information of the last week stored in the memory, the recording and reproducing unit to record the television program of this week into the recording medium.

According to the structure as stated above, by using the program identification information stored in the memory, the television program of the same day of the week, the same broadcast time zone, and the same channel as those of the television program of the last week is recorded as the television program of this week into the recording medium, and accordingly, even in the case where the watching of a television program desired to be watched every week is forgotten or the record reservation thereof is forgotten, the television program to be watched every week can be watched without fail.

Besides, according to the information recording and reproducing apparatus of the invention, in the above structure, the system controller includes a channel comparison unit configured to compare, when the main power source is on, a present set channel of the tuner with a channel indicated by the program identification information of the last week stored in the memory, a program watching determination unit configured to determine that when a result of the comparison indicates that the channels are different from each other, the television program of the channel different from that of the television program of the last week is watched, a channel switching unit configured to switch, when the time reaches the record start time of the television program of this week corresponding to the program identification information of the last week stored in the memory after the program watching determination unit determines that the television program of the channel different from that of the television program of the last week is watched, the tuner to the channel on which the television program of this week is broadcast and to switch a tuner of a television receiver connected to the apparatus to the channel of the presently watched television program, and a channel post-switching program recording unit configured to cause the recording and reproducing unit to record the television program of this week into the recording medium after the tuner is switched to the channel on which the television program of this week is broadcast.

According to the structure as stated above, the power source of the apparatus is turned on, and even when the other television program is watched, when the time reaches the record start time of the television program of this week corresponding to the program identification information of the last week stored in the memory, the tuner on the apparatus side is switched to the channel on which the television program of this week is broadcast, and the television program of this week is recorded, and besides, the other television program is received by the tuner of the television receiver without change and can be continuously watched.

DESCRIPTION OF THE PREFERRED EMBODIMENTS

Figure 1:
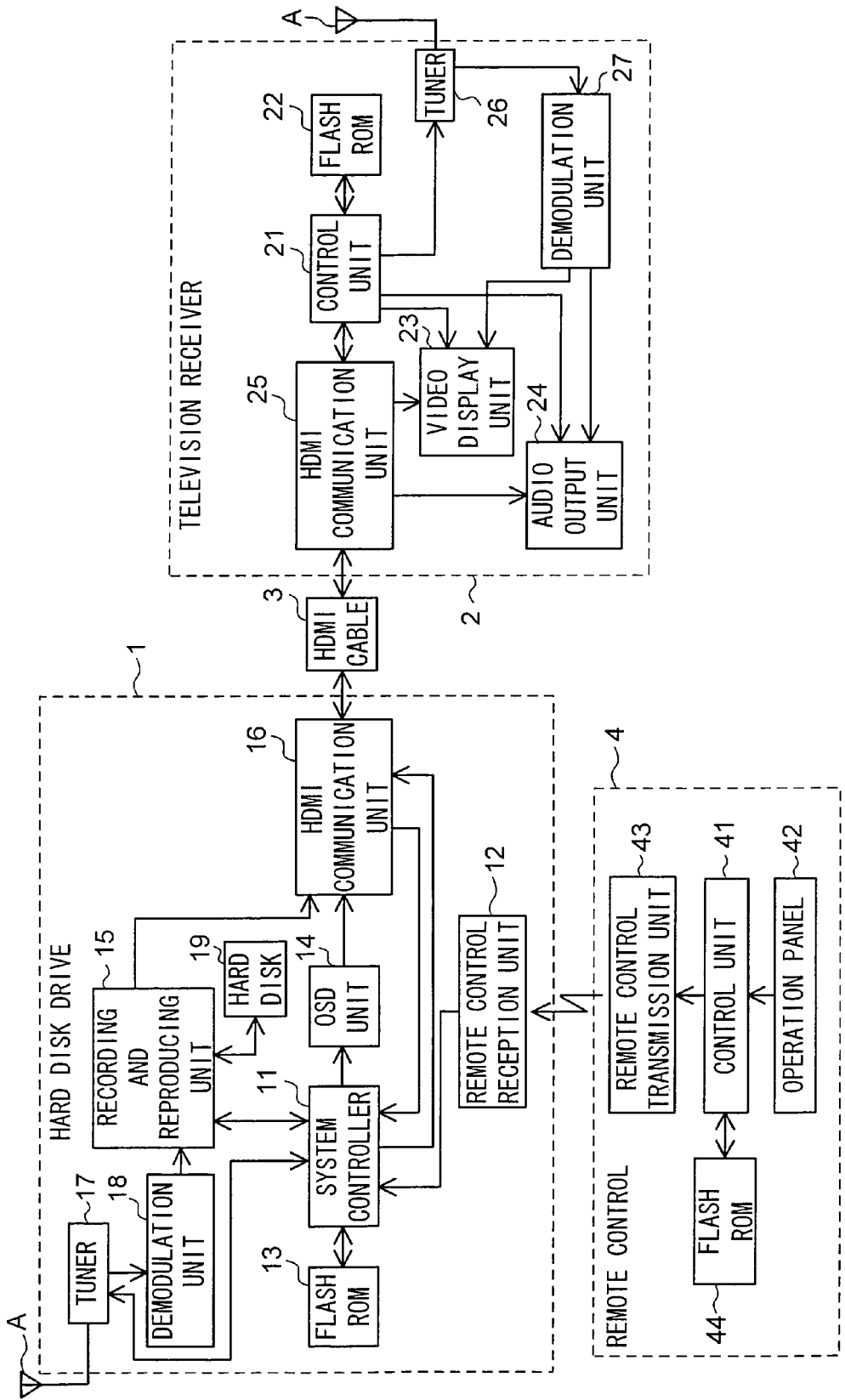
FIG. 1 is a block diagram showing a structure of a hard disk drive as an information recording and reproducing apparatus of an embodiment of the invention and a television receiver as a receiver equipment.

Hereinafter, an embodiment of the invention will be described with reference to the accompanying drawings. FIG. 1 is a block diagram showing a structure of a hard disk drive as an information recording and reproducing apparatus of the embodiment of the invention and a television receiver as a receiver equipment.

In FIG. 1, a hard disk drive 1 includes a system controller 11 that includes a CPU and the like and controls the whole apparatus, a tuner 17 to extract a video and audio signal of a desired broadcast station from television broadcast signals received through an antenna A, a demodulation unit 18 to demodulate the video and audio signal from the tuner 17, a recording and reproducing unit 15 that compresses the demodulated video and audio signal to record it as video and audio data into a hard disk 19 and expands the video and audio data recorded in the hard disk 19 to reproduce the video and audio signal, a remote control reception unit 12 to receive a remote control code transmitted from a remote control 4, a flash ROM 13 to store a table showing a correspondence relation between a maker name of a television receiver 2 connected through an HDMI (High Definition Multimedia Interface) cable 3 and a remote control code, an OSD (On Screen Display) unit 14 to display character information on the television receiver 2, and an HDMI communication unit 16 to perform communication with the television receiver 2 through the HDMI cable 3.

The television receiver 2 includes a control unit 21 that includes a CPU and the like and controls the whole receiver, a tuner 26 to extract a video and audio signal of a desired broadcast station from television broadcast signals received through the antenna A, a demodulation unit 27 to demodulate the video and audio signal from the tuner 26, a flash ROM 22 to store a control program of the control unit 21, EDID (Extended Display identification Data) having identification data of a specified format including a maker name of the receiver and the like, a video display device 23 that includes a video circuit, a display device and the like and inputs the video signal from the demodulation unit 27 to display a video, an audio output unit 24 that includes an audio circuit, a speaker and the like and inputs the audio signal from the demodulation unit 27 to output a sound, and an HDMI communication unit 25 to communicate with the hard disk drive 1 through the HDMI cable 3.

The remote control 4 includes a control unit 41 that includes a CPU and the like and controls the whole remote control, an operation panel 42 provided with plural operation keys to which operation key numbers are previously assigned and which remotely control the hard disk drive 1 and the television receiver 2, a remote control transmission unit 43 to transmit a remote control code corresponding to the operation key of the operation panel 42 to the hard disk drive 1, and a flash ROM 44 to store plural remote control codes at addresses corresponding to the operation key numbers of the operation keys of the operation panel 42.

The system controller 11 includes a program identification information storage unit to store, in a case where an automatic recording function is set and when the television program is watched or the television program is reservation-recorded, program identification information including a broadcast day of the week, a broadcast time zone and a channel of the television program into the flash ROM 13, a program recording unit to cause, when a main power source of the apparatus is off and when a time reaches a record start time of a television program of this week corresponding to program identification information of the last week stored in the flash ROM 13, the recording and reproducing unit 15 to start recording and to cause the recording and reproducing unit 15 to record the television program of this week into the hard disk 19, a channel comparison unit to compare a present set channel of the tuner 17 on the apparatus side with a channel indicated by the program identification information of the last week when the main power is on, a program watching determination unit to determine that the television program of the channel different from that of the television program of the last week is watched when a result of the comparison indicates that the channels are different from each other, a channel switching unit to switch, when the time reaches the record start time of the television program of this week corresponding to the program identification information of the last week stored in the flash ROM 13 after it is determined that the television program is watched, the tuner 17 on the apparatus side to the channel on which the television program of this week is broadcast and to switch the tuner 26 of the television receiver 2 connected to the apparatus to the channel of the presently watched television program, and a channel post-switching program recording unit to cause the recording and reproducing unit 15 to record the television program of this week into the hard disk 19 after the tuner 17 on the apparatus side is switched to the channel on which the television program of this week is broadcast.

Figure 2:
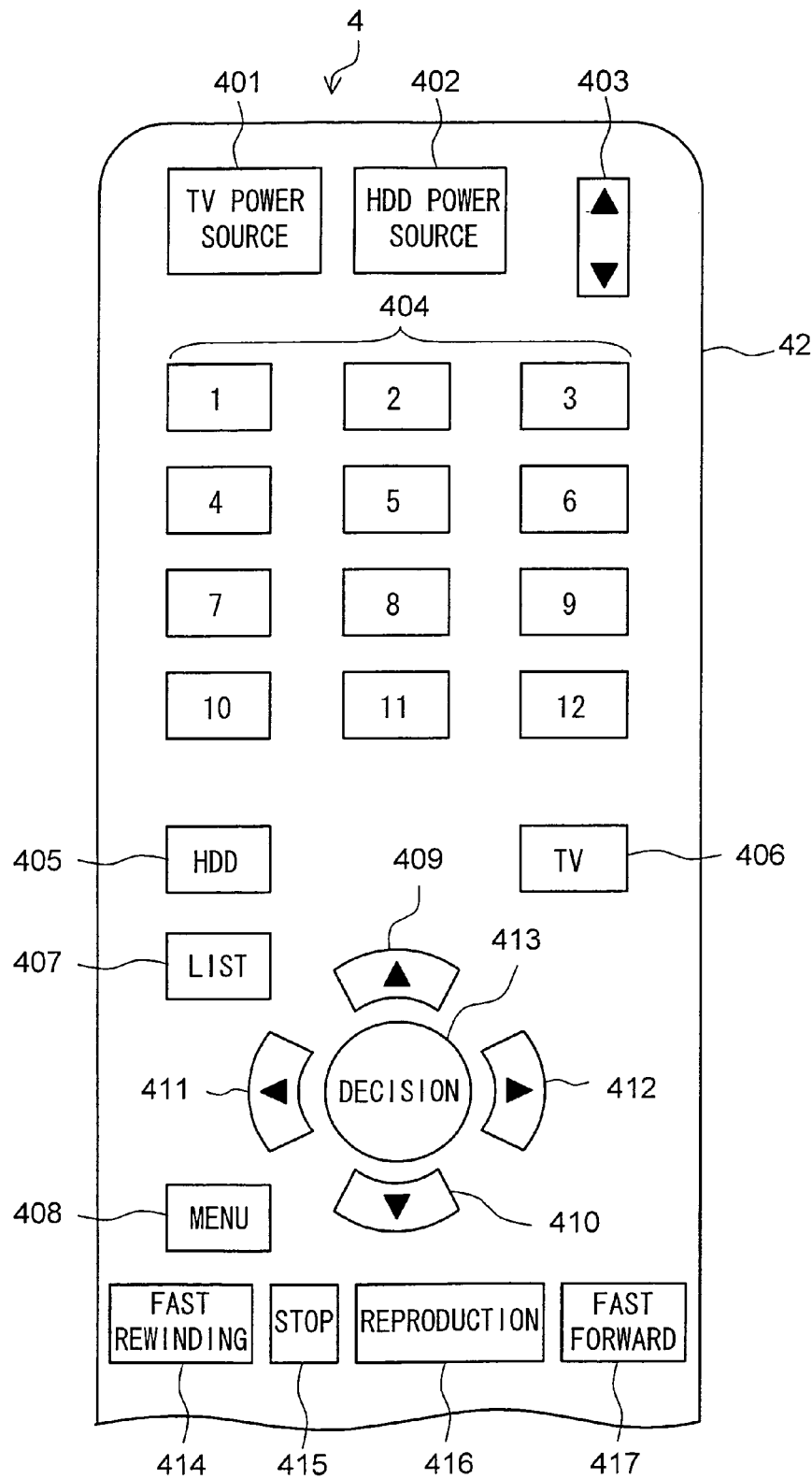
FIG. 2 is a view showing an example of a key arrangement of a remote control in the embodiment of the invention.

FIG. 2 is a view showing an example of a key arrangement of the remote control in the embodiment. In FIG. 2, an operation panel 42 of the remote control 4 includes a TV power source key 401, an HDD power source key 402, a volume key 403, plural numerical keys 404, an HDD mode switching key 405, a TV mode switching key 406, a reproduction list key 407, a menu key 408, an upward key 409, a downward key 410, a leftward key 411, a rightward key 412, a decision key 413, a fast rewinding key 414, a stop key 415, a reproduction key 416, a fast forward key 417 and the like. Incidentally, the arrangement of the keys and the number thereof are examples and no limitation is made to these.

Figure 3:
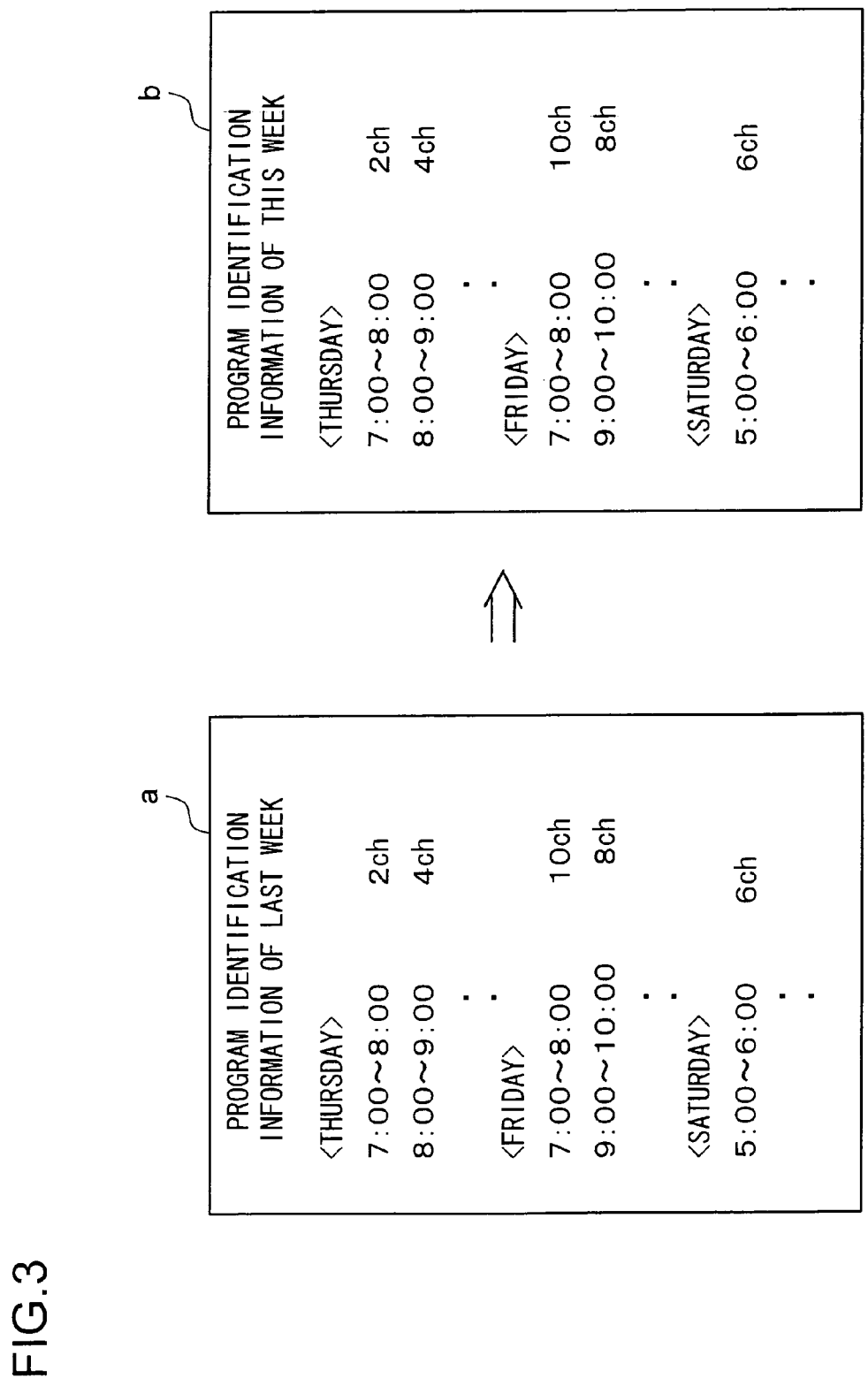
FIG. 3 is a view showing a broadcast day of the week, a broadcast time zone and a channel of a television program watched or reservation-recorded in the last week, and a broadcast day of the week, a broadcast time zone and a channel of a television program recorded in this week in the embodiment of the invention.

FIG. 3 is a view showing, in the embodiment, a broadcast day of the week, a broadcast time zone and a channel of a television program watched or reservation-recorded in the last week, and a broadcast day of the week, a broadcast time zone and a channel of a television program recorded in this week.

In FIG. 3, the broadcast day of the week, the broadcast time zone and the channel of the television program watched or reservation-record in the last week are shown in a frame "a". For example, in the case of television programs watched or recorded on Thursday of the last week, it is shown that the broadcast time zone is 7:00 to 8:00 and the channel is channel 2, and the broadcast time zone is 8:00 to 9:00 and the channel is channel 4. In the case of television programs watched or recorded on Friday of the last week, it is shown that the broadcast time zone is 7:00 to 8:00 and the channel is channel 10, and the broadcast time zone is 9:00 to 10:00 and the channel is channel 8. In the case of television programs watched or recorded on Saturday of the last week, it is shown that the broadcast time zone is 5:00 to 6:00 and the channel is channel 6.

The broadcast day of the week, the broadcast time zone and the channel of the television program recorded in this week are shown in a frame "b". For example, in the case of television programs recorded on Thursday of this week, it is shown that the broadcast time zone is 7:00 to 8:00 and the channel is channel 2, and the broadcast time zone is 8:00 to 9:00 and the channel is channel 4. In the case of television programs recorded on Friday of this week, it is shown that the broadcast time zone is 7:00 to 8:00 and the channel is channel 10, and the broadcast time zone is 9:00 to 10:00 and the channel is channel 8. In the case of television programs recorded on Saturday of this week, it is shown that the broadcast time zone is 5:00 to 6:00 and the channel is channel 6.

As is understood from the content shown in the frame "a" and the frame "b", the television programs watched or recorded in the last week are automatically recorded also in this week. For example, in order to watch the television program of the broadcast time zone of 7:00 to 8:00 and the channel of channel 2 on Thursday of the last week, when the main power source of the hard disk drive 1 is turned on, a channel selection is made by the tuner 17, and the television program is video-outputted and audio-outputted to the television receiver 2, when the time reaches 7:00 of Thursday of this week, the television program of channel 2 is recorded from 7:00 to 8:00. Besides, also in the case where the television program is reservation-recorded, similarly, when the time reaches 7:00 of Thursday of this week, the television program of channel 2 is recorded from 7:00 to 8:00.

Figure 4:
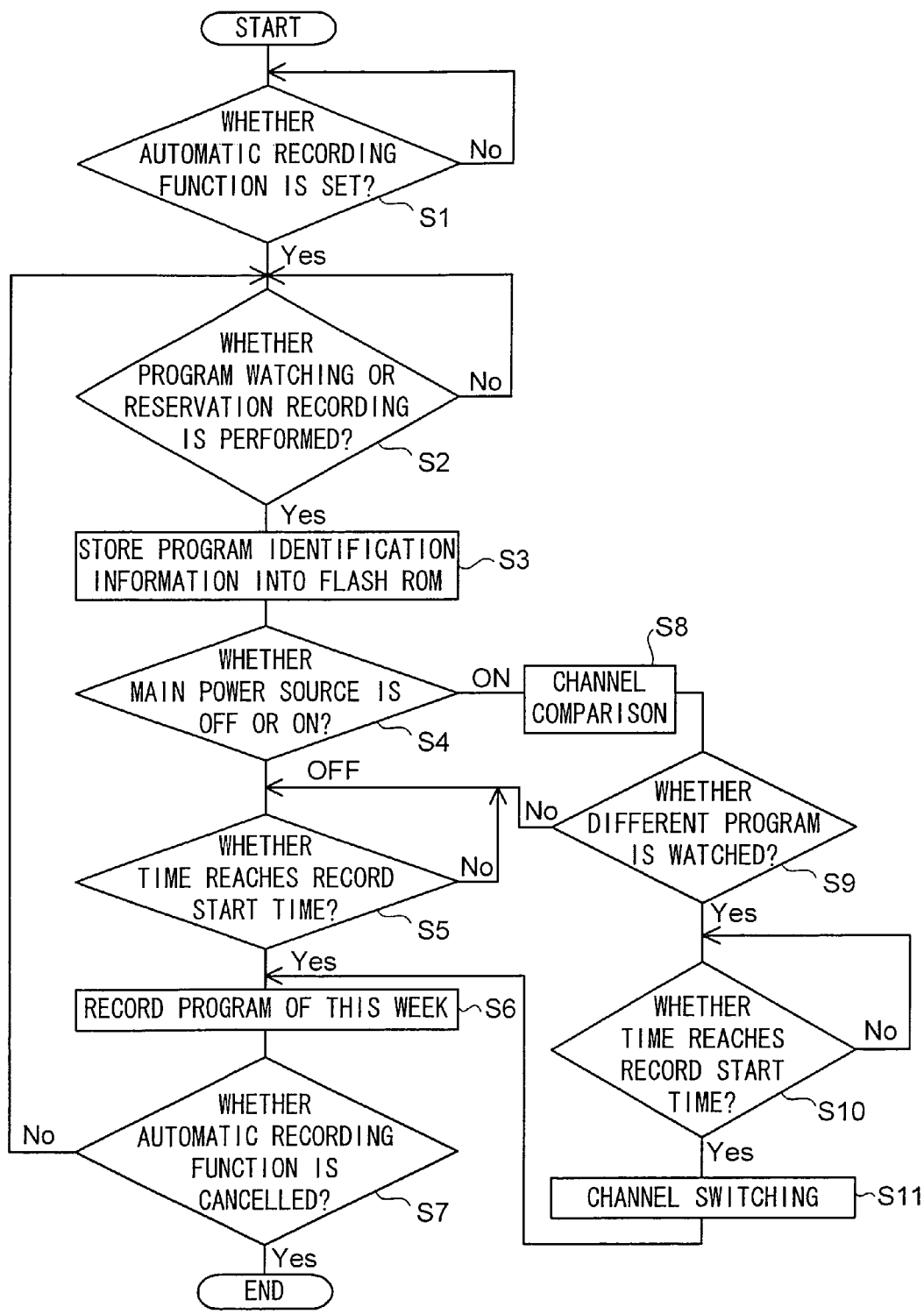
FIG. 4 is a flowchart for explaining a process of a case where an automatic recording function to automatically record a television program in the embodiment of the invention is set.

FIG. 4 is a flowchart for explaining a process of a case where an automatic recording function to automatically record a television program in the embodiment is set. The process of the case where the automatic recording function is set will be described with reference to the flowchart and FIG. 1 to FIG. 3.

First, the user depresses the power source key 401 of the remote control 4 to turn on the main power source of the television receiver 2, and depresses the HDD power source key 402 to turn on the main power source of the hard disk drive 1. Next, the user depresses the HDD mode switching key 405 to switch the remote control 4 to the HDD mode and to switch the input mode of the television receiver 2 to the video mode. By this, the television receiver 2 inputs video and audio signals and character signals from the hard disk drive 1, and can output video and characters and can output sound.

Here, in order to set the automatic recording function, the user depresses the menu key 408 of the remote control 4 to cause the video display unit 23 of the television receiver 2 to display a function menu screen showing the menu of various functions, and selects and decides items of the automatic recording functions from the function menu screen by the operation of the upward key 409, the downward key 410, the leftward key 411, the rightward key 412, the decision key 413 and the like in the remote control 4. By this, the system controller 11 of the hard disk drive 1 sets the automatic recording function (step S1).

In the state where the automatic recording function is set as stated above, when the user operates the remote control 4 to watch a desired television program selected by the tuner 17 or to reservation-record a desired television program (step S2), the program identification information storage unit of the system controller 11 stores program identification information including the broadcast day of the week, the broadcast time zone and the channel of the television program into the flash ROM 13 (step S3).

After the desired television program is watched, the user depresses the HDD power source key 402 and the TV power source key 401 of the remote control 4 to turn off the main power source of the hard disk drive 1 and the main power source of the television receiver 2. Besides, when the reservation record of the desired television program is ended, the system controller 11 of the hard disk drive 1 turns off the main power source of the hard disk drive 1.

At the process of step S3, the program identification information stored in the flash ROM 13 is, for example, as shown in FIG. 3, the program identification information including the broadcast day of the week, the broadcast time zone and the channel of the television program of the last week.

Here, a description will be given to a process of a case where the main power source of the hard disk drive 1 is off, and the television program watched or reservation-recorded in the last week is recorded also in this week.

When the main power source of the hard disk drive 1 is off (step S4), and when the present time measured by a not-shown timer reaches the record start time (broadcast start time of the broadcast time zone) of the television program of this week corresponding to the program identification information of the last week stored in the flash ROM 13 (step S5), the program recording unit of the system controller 11 causes the recording and reproducing unit 15 to perform the record operation and causes the recording and reproducing unit 15 to record the television program of this week into the hard disk 19 (step S6). As long as the automatic recording function is not cancelled (step S7), return is made to the process of step S2, and the same process is performed.

Next, a description will be given to a process of a case where the main power source of the hard disk drive 1 is on, and the television program watched or reservation-record in the last week is recorded also in the this week.

When the main power source of the hard disk drive 1 is on (step S4), the channel comparison unit of the system controller 11 compares the present set channel of the tuner 17 with the channel indicated by the program identification information of the last week stored in the flash ROM 13 (step S8). When a result of the comparison indicates that the channels are different from each other, the program watching determination unit of the system controller 11 determines that the television program of the channel different from that of the television program of the last week is watched (step S9).

After it is determined that the television program is watched, when the present time measured by the not-shown timer reaches the record start time (broadcast start time of the broadcast time zone) of the television program of this week corresponding to the program identification information of the last week stored in the flash ROM 13 (step S10), the channel switching unit of the system controller 11 switches the tuner 17 to the channel on which the television program of this week is broadcast, and switches the tuner 26 of the television receiver 2 to the channel of the presently watched television program (step S11).

After the tuner 17 of the hard disk drive 1 is switched to the channel on which the television program of this week is broadcast, the channel post-switching program recording unit of the system controller 11 causes the recording and reproducing unit 15 to perform the record operation, and causes the recording and reproducing unit 15 to record the television program of this week corresponding to the program identification information of the last week recorded in the flash ROM 13 into the hard disk 19 (step S6). As long as the automatic recording function is not cancelled (step S7), return is made to the process of step S2, and the same process is performed.

In the case where the automatic recording function is cancelled, the menu key 408 of the remote control 4 is depressed to cause the video display unit 23 of the television receiver 2 to display the function menu screen showing the menu of various functions, and selects and decides items of the automatic recording function from the function menu screen by the operation of the upward key 409, the downward key 410, the leftward key 411, the rightward key 412, the decision key 413 and the like in the remote control 4. By this, the system controller 11 of the hard disk drive 1 cancels the automatic recording function (step S7), and ends this process.

By the process as described above, for example, the television program of the same day of the week, the same broadcast time zone, and the same channel as those of the television program of the last week indicated by the program identification information shown in the frame "a" of FIG. 3 is recorded as the television program of this week into the hard disk 19.

As described above, according to this embodiment, by using the program identification information stored in the flash ROM 13, the television program of the same day of the week, the same broadcast time zone, and the same channel as those of the television program of the last week is recorded as the television program of this week into the hard disk 19, and therefore, even in the case where the watching of a television program desired to be watched every week is forgotten, or the record reservation thereof is forgotten, the television program desired to be watched every week can be watched without fail. Besides, even when the power source of the apparatus is turned on and the other television program is watched, when the time reaches the record start time of the television program of this week corresponding to the program identification information of the last week stored in the flash ROM 13, the tuner 17 on the apparatus side is switched to the channel on which the television program of this week is broadcast, and the television program of this week is recorded, while the other television program is received by the tuner 26 of the television receiver 2 without change and can be continuously watched.

What is claimed is:

1. An information recording and reproducing apparatus, comprising:
   a tuner;
   a recording and reproducing unit configured to record a television program selected by the tuner into a recording medium and to reproduce the television program recorded in the recording medium; and
   a system controller that includes
   a program identification information storage unit configured to store, in a case where an automatic recording function, whereby a television program next week that has a same broadcast day of week, broadcast time zone, and channel as a watched or record-reserved television program is automatically recorded, is set and when the television program is watched or when the television program is reservation-recorded, program identification information including a broadcast day of the week, a broadcast time zone and a channel of the television program into a memory, and
   a program recording unit configured to cause, when a main power source of the apparatus is off and when a time reaches a record start time of a television program corresponding to program identification information stored in the memory, the recording and reproducing unit, which is supplied with electric power, to record the television program into the recording medium.

2. The information recording and reproducing apparatus according to claim 1, wherein the system controller includes
   a channel comparison unit configured to compare, when the main power source is on, a present set channel of the tuner with a channel indicated by the program identification information stored in the memory,
   a program watching determination unit configured to determine that when a result of the comparison indicates that the channels are different from each other, the television program of the channel different from that of the television program corresponding to the program identification information is watched,
   a channel switching unit configured to switch, after the program watching determination unit determines that the television program of the channel different from that of the television program corresponding to the program identification information is watched, when the time reaches the record start time of the television program corresponding to the program identification information stored in the memory, the tuner to the channel on which that television program is broadcast and to switch a tuner of a television receiver connected to the apparatus to the channel of the presently watched television program, and
   a channel post-switching program recording unit configured to cause, after the tuner is switched to the channel on which the television program is broadcast, the recording and reproducing unit to record that television program into the recording medium.

* * * * *